United States Patent [19]
Lu et al.

[11] Patent Number: 5,820,963
[45] Date of Patent: Oct. 13, 1998

[54] METHOD OF MANUFACTURING A THIN FILM MAGNETIC RECORDING MEDIUM HAVING LOW MRT VALUE AND HIGH COERCIVITY

[75] Inventors: Miaogen Lu, Fremont; Rajiv Yadav Ranjan, San Jose, both of Calif.

[73] Assignee: Komag, Incorporated, San Jose, Calif.

[21] Appl. No.: 832,028

[22] Filed: Apr. 2, 1997

[51] Int. Cl.$^6$ ........................................... G11B 5/66
[52] U.S. Cl. .......................... 428/65.3; 428/610; 428/668; 428/673; 428/674; 428/684 TS; 428/684 TP; 428/694 TM; 428/900; 427/127; 427/131; 427/132; 204/192.2
[58] Field of Search ..................... 428/65.3, 610, 428/668, 673, 674, 684 TS, 684 TP, 684 TM, 900; 427/131, 127, 132; 204/182.2

[56] References Cited

U.S. PATENT DOCUMENTS

| | | | |
|---|---|---|---|
| 5,543,221 | 8/1996 | Kitokomi | 428/332 |
| 5,580,667 | 12/1996 | Lal | 428/610 |
| 5,605,733 | 2/1997 | Iskikowa | 428/65.3 |
| 5,683,426 | 11/1997 | Lee | 428/611 |

*Primary Examiner*—Leszek Kiliman
*Attorney, Agent, or Firm*—Skjerven, Morrill, MacPherson, Franklin & Friel

[57] ABSTRACT

A method for manufacturing a magnetic disk includes the step of providing first and second cobalt alloy layers on a substrate. The first cobalt alloy layer is non-ferromagnetic, and the second cobalt alloy layer is ferromagnetic. The non-ferromagnetic layer is deposited on an underlayer. The non-ferromagnetic cobalt alloy provides a better crystal structure for depositing the subsequent ferromagnetic layer and thereby improves its magnetic properties. However, because the first cobalt alloy layer is not ferromagnetic, it does not adversely affect the magnetic characteristics of the disk.

16 Claims, 3 Drawing Sheets

METHOD OF MANUFACTURING A THIN FILM MAGNETIC RECORDING MEDIUM HAVING LOW MRT VALUE AND HIGH COERCIVITY

CROSS-REFERENCE TO RELATED APPLICATIONS

This application is related to our co-pending U.S. patent application entitled "Method of Manufacturing a Thin Film Magnetic Recording Medium Having Low MrT Value and High Coercivity", attorney docket no. M-4786 U.S. Pat. No. 08/829,995, now pending, filed on the same day as the present application and incorporated herein by reference.

BACKGROUND

This invention relates to magnetic recording media, and more specifically, to a method for making a thin film magnetic recording medium having a low MrT value and a high coercivity Hc.

Industry constantly strives to increase the recording density in magnetic disks. We expect that to further increase recording density, future magnetic recording media will have low MrT values. (MrT equals magnetic remanence Mr times the thickness T of the magnetic film in a magnetic recording disk.) Media with a MrT value as low as 0.75 memu/cm$^2$ are presently under development.

One method for reducing MrT for a given magnetic alloy is to reduce thickness T. (Mr for a given alloy is constant. Thus, one adjusts MrT for a given alloy by adjusting thickness T.) Unfortunately, as thickness is reduced such that MrT is less than about 0.8 memu/cm$^2$, coercivity Hc starts to drop. We believe that at present, reducing MrT to 0.75 memu/cm$^2$ or lower while maintaining Hc at 2300 Oe or higher may not be feasible using current technology, because Hc is extremely sensitive to thickness.

FIG. 1 illustrates a prior art magnetic disk 1 comprising an Al alloy substrate 2, a plated NiP alloy layer 3, a sputtered amorphous NiP alloy layer 4, a magnetic Co alloy layer 5, and a protective hydrogenated carbon overcoat 6. In disk 1, layers 4, 5 and 6 are formed by sputtering. (Sputtered NiP alloy layers such as layer 4 are discussed in U.S. Pat. No. 5,153,044, incorporated herein by reference. Further information concerning formation of layers 4 to 6 is provided in U.S. patent application Ser. No. 08/286,653, filed by Tu Chen, et al. on Aug. 5, 1994, now U.S. Pat. No. 5,658,659, assigned to Komag, Inc. and incorporated herein by reference.)

We have discovered that sputtered magnetic alloy layer 5 includes a portion 5a which has a poor crystal lattice structure. The reason why portion 5a has a poor crystal lattice structure is that it is formed and nucleates on an amorphous layer (layer 4). (This effect may also occur with a crystalline underlayer, such as Cr, e.g. if $O_2$ or $H_2O$ are present in the sputtering atmosphere or there is a sufficient delay between the deposition of the underlayer and the magnetic layer. This effect may also occur if there is a large lattice mismatch between the non-magnetic underlayer and the magnetic layer.)

When layer 5 is fairly thick, portion 5a has a minimal effect on the magnetic characteristics of the disk. However, as layer 5 becomes thinner, portion 5a has a larger effect on the magnetic characteristics of the disk. Thus, as layer 5 becomes thinner, portion 5a is responsible in large part for the drop in coercivity Hc.

SUMMARY

We have discovered a method for eliminating or minimizing the effect of the above-mentioned portion containing a poor lattice structure. In accordance with our method, we cause this portion to be non-magnetic so that it will not adversely affect the magnetic characteristics of the magnetic disk. In a first embodiment, we add 25 or more at. % Cr to an initially deposited portion of the Co alloy layer to make the Co alloy layer non-ferromagnetic. Thereafter, we deposit the remainder of the Co alloy layer. The remainder of the Co alloy layer has less than 25 at. % Cr (and typically less than 20 at. % Cr), and is ferromagnetic.

Of importance, the initially deposited portion of the Co alloy layer has a hexagonal close-packed (HCP) crystal structure. The remainder of the Co alloy layer also has a HCP crystal structure, and is deposited in an epitaxial relation with the initially deposited portion. Preferably, the lattice mismatch between the initially deposited portion and the remainder is less than about 10%, and preferably less than about 5%. (Lattice mismatch is controlled by controlling the composition of the initially deposited portion with respect to the remainder. For example, one can increase the lattice size of an alloy by adding elements having large atoms to the alloy.)

In lieu of adding 25% Cr, other non-magnetic materials can be added to the initially deposited portion, e.g. Re, Zr, Hf, Ta, Os, Ir, Ru, Rh or any other element which tends to stabilize the Co alloy in an HCP phase as long as the total atomic percentage of these additives is sufficient to render the initially deposited portion non-magnetic. Elements meeting these requirements can be ascertained from "Binary Alloy Phase Diagrams", Edited by Massalski et al., published by The American Society for Metals in 1986, incorporated herein by reference. Elements which, when alloyed with Co in sufficient quantity, cause the Curie temperature to drop below room temperature, effectively render the initially deposited portion non-magnetic. In one embodiment, these materials comprise greater than 20 at. % of the initial portion, and typically between 20 and 40 at. % of the initial portion. In another embodiment, these materials comprise greater than 25 at. % of the initial portion.

In another embodiment, the initially deposited portion contains more than 11 at. % Cr, along with one or more of the above-mentioned materials. Of importance, Cr is useful for retarding corrosion, and can shield the magnetic layer from any impurities diffusing or migrating upwardly from the substrate.

DETAILED DESCRIPTION

Figure 1:
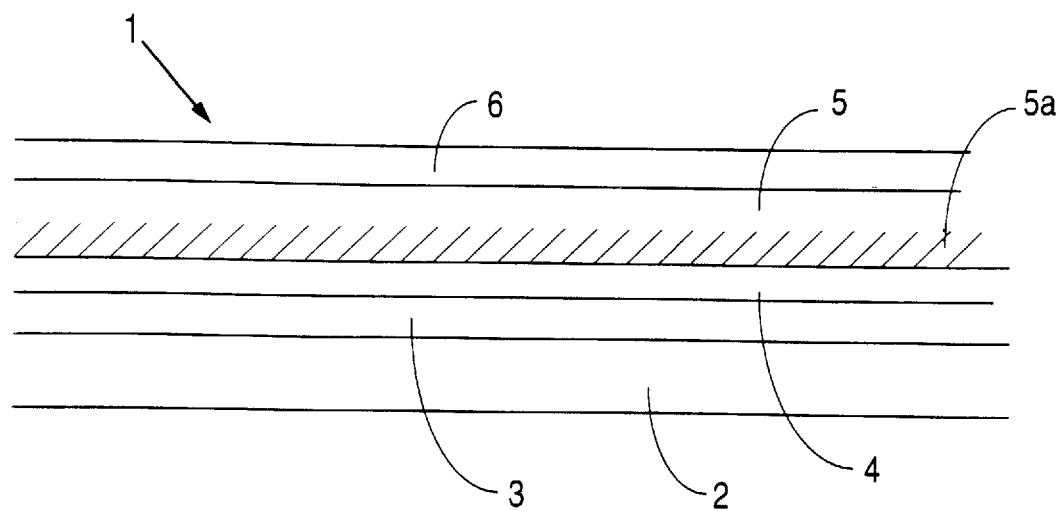
FIG. 1 illustrates in cross section a magnetic disk constructed in accordance with the prior art.
Figure 2:
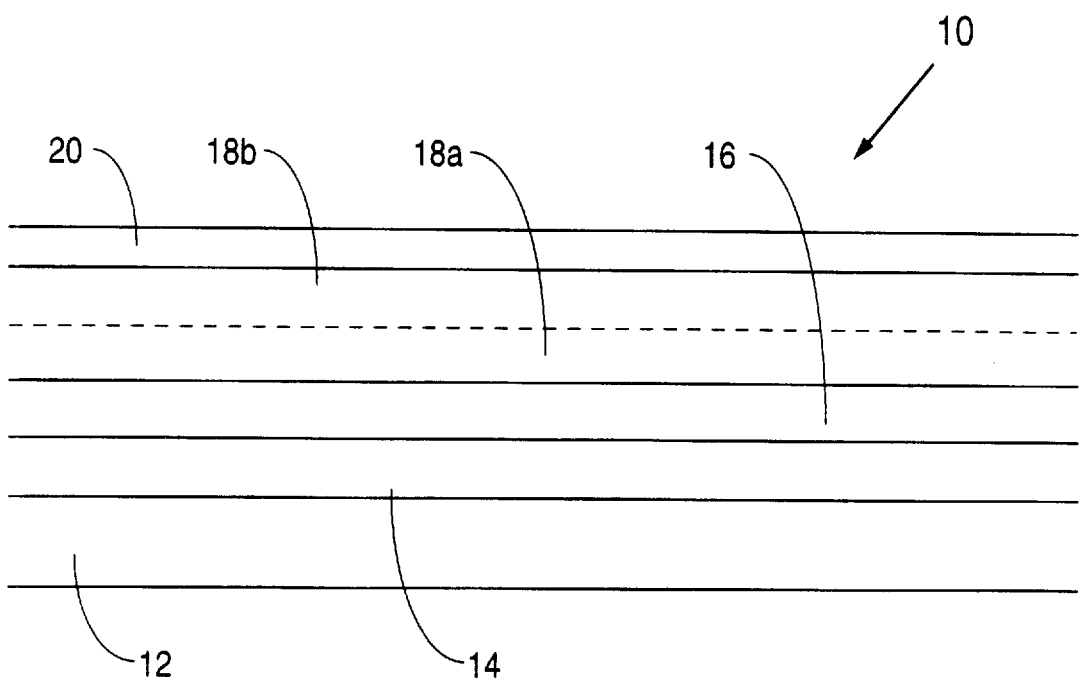
FIG. 2 illustrates in cross section a magnetic disk constructed in accordance with our invention.

FIG. 2 illustrates a magnetic disk 10 in accordance with our invention. Magnetic disk 10 includes an Al alloy substrate 12 electroless plated with a NiP layer 14. NiP layer 14 is typically about 10 μm thick and is textured. Instead of using Al alloy substrate 12 and NiP layer 14, other substrate materials can be used, e.g. glass, sintered carbon, ceramic or other appropriate materials.

Disk 10 also includes a sputtered NiP layer 16. In other embodiments layer 16 includes Ni with materials other than P, e.g. as described in above-incorporated U.S. Pat. No. 5,153,044. In addition, layer 16 can include an oxide, such as 4% $SiO_2$, to achieve grain isolation and a microstructure similar to the magnetic layer. Layer 16 can contain other oxides in addition to or in lieu of $SiO_2$ (e.g. $Al_2O_3$). See above-incorporated application Ser. No. 08/286,653, now U.S. Pat. No. 5,658,659, which provides further information about layer 16. (Materials other than Ni alloys, e.g. Cr and its alloys can be used. Of importance, layer 16 controls the grain size of a subsequently deposited magnetic layer. This is discussed in the above-incorporated '659 patent.)

Above layer 16 are sputtered first and second cobalt alloy layers 18a, 18b, and a protective overcoat 20. Protective overcoat 20 can be hydrogenated carbon, e.g. as discussed in European patent application EP 0 440 259 A2, $ZrO_2$ as discussed in U.S. Pat. Nos. 4,929,500 and 4,898,774, or other appropriate materials. (The '259 application, and the '500 and '774 patents are incorporated herein by reference.)

Layers 18a and 18b are typically cobalt alloys. (In lieu of a Co alloy, layer 18a can be a non-Co alloy, but it should have a HCP structure with a good lattice match with layer 18b.) Layer 18a is not ferromagnetic, while layer 18b is ferromagnetic. In one embodiment, layer 18a comprises $Co_{72}Cr_{16}Re_8(SiO_2)_4$. In lieu of, or in addition to the Cr and Re, layer 18a can include Ta, Ti, Zr, W, Hf, Os, Ir, Ru, or other elements which help to stabilize the HCP phase of layer 18a.

Layer 18b comprises a magnetic Co alloy. Typically, layer 18b comprises $Co_{72}Cr_{11}Pt_{13}(SiO_2)_4$. However, layer 18b can also contain one or more of Ta, Ti, W, Zr, Ni or Si. These elements are typically added to assist layer 18b to resist corrosion. Pt is typically added to layer 18b in a concentration up to about 19 at. % to improve coercivity of layer 18b.

(The $SiO_2$ in layers 18a and 18b cause grain isolation in layers 18a, 18b. This reduces noise in the magnetic layer, as described in the '653 application. The $SiO_2$ content should be between 4 and 10 at. % of layer 18a and 18b.)

Layers 18a and 18b can be formed using RF diode, RF magnetron or DC magnetron sputtering. Sputtering is typically accomplished in an Ar atmosphere or an Ar atmosphere comprising up to 2% $N_2$. The gas pressure is typically in the range of 5 to 30 mtorr. The deposition rate is between 0.1 and 4 nm/second.

Figure 3:
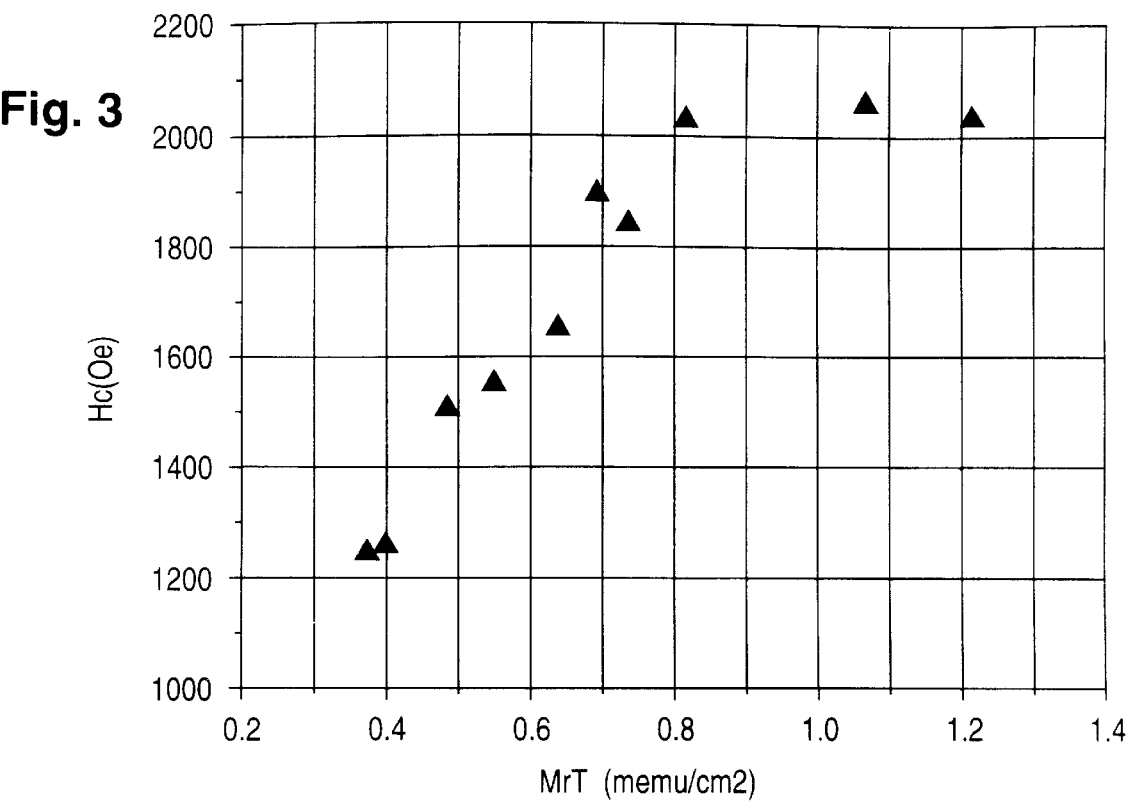
FIG. 3 illustrates the relation between coercivity Hc and MrT for a magnetic disk in accordance with the prior art.

FIG. 3 illustrates the relation between Hc and MrT for a magnetic disk constructed in accordance with the prior art. In FIG. 3, the magnetic disk comprised an Al alloy substrate, a NiP layer electroless plated onto the substrate, and a sputtered NiP underlayer. The underlayer was 10 nm thick and comprised 2 wt. % $Al_2O_3$. A magnetic alloy comprising $Co_{72}Cr_{11}Pt_{13}(SiO_2)_4$ was sputtered on top of the sputtered NiP underlayer. As can be seen, for MrT values above 0.8 memu/cm², coercivity Hc was about 2050 Oe. However, for MrT values below 0.8 memu/cm², coercivity declined to about 1250 Oe for MrT values of 0.4 memu/cm². These disks were sputtered at a base pressure of $2\times10^{-7}$ Torr. The Argon pressure was 20 mTorr. The NiP deposition rate was 1 Å/second and the magnetic layer deposition rate was 5 Å/second.

Figure 4:
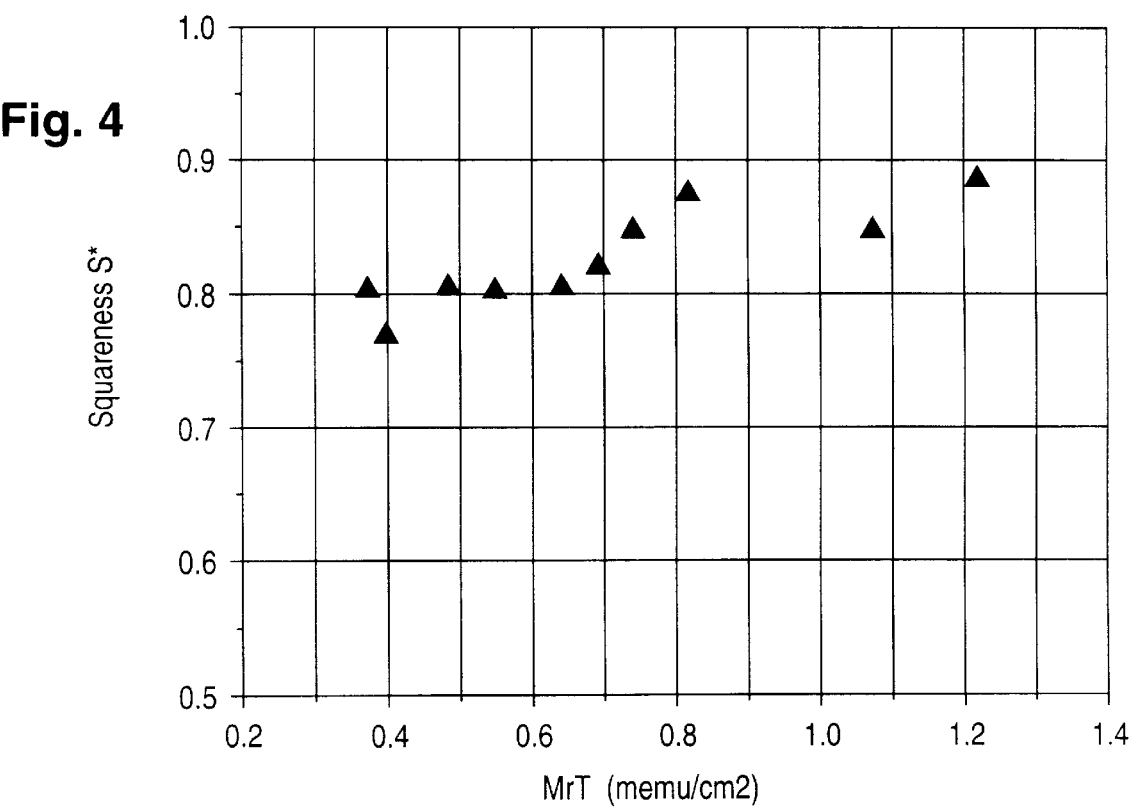
FIG. 4 illustrates the relation between squareness S* and MrT for a magnetic disk in accordance with the prior art.

FIG. 4 illustrates the relation between MrT and S* for magnetic disks having the same composition and structure as the disks of FIG. 3. (S* is a well-known magnetic parameter, and is discussed in U.S. Pat. No. 4,749,459, incorporated herein by reference (see Col. 5).) For MrT values greater than 0.8 memu/cm², S* was about 0.85. For MrT values less than 0.8 memu/cm², S* dropped to about 0.8. (High S* values are desirable because they provide better overwrite (OW) and narrower pulse width (PW50). This permits greater recording density.)

Figure 5:
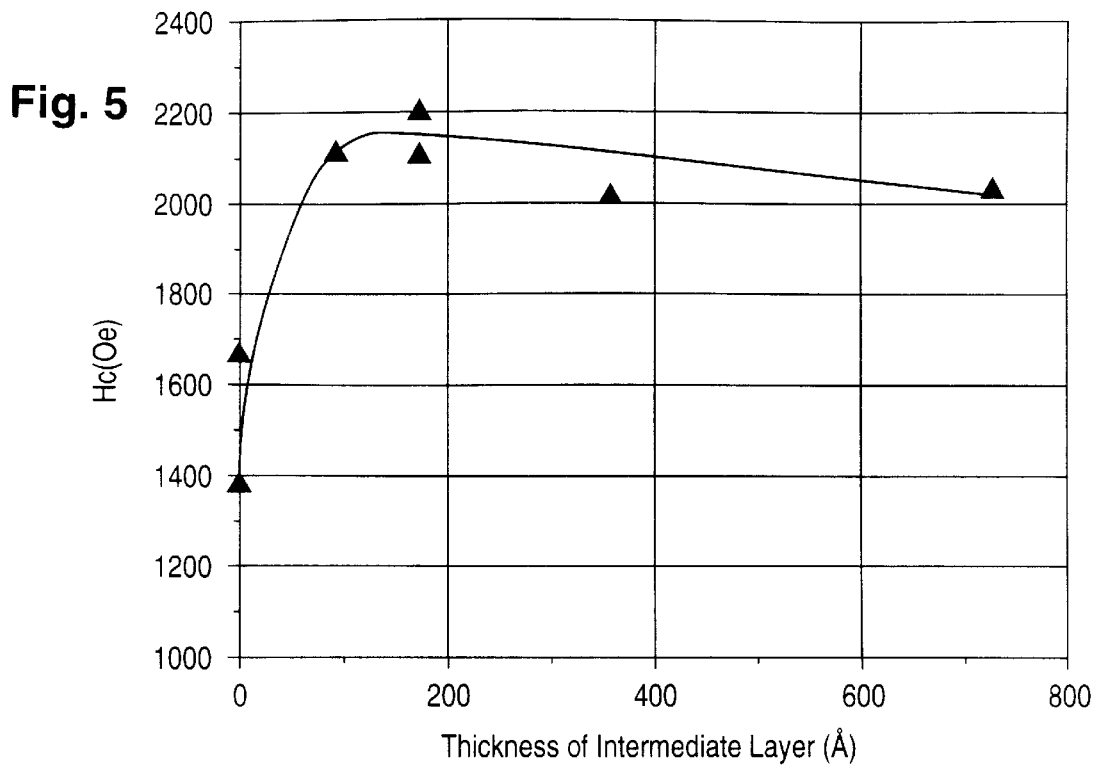
FIG. 5 illustrates the relation between coercivity Hc of the magnetic layer and the thickness of an intermediate non-magnetic layer in a magnetic disk constructed in accordance with our invention.

FIG. 5 illustrates the relation between the thickness of a non-magnetic intermediate layer and the coercivity Hc of a magnetic layer in a magnetic disk constructed in accordance with our invention. This disk comprised an Al alloy substrate, a NiP layer electroless plated onto the Al alloy substrate, and a sputtered NiP underlayer. This portion of the magnetic disk was identical to the corresponding structures for the disks in FIGS. 3 and 4. However, a non-magnetic $Co_{72}Cr_{16}Re_8(SiO_2)_4$ intermediate film was sputtered on top of the sputtered NiP layer, and a $Co_{72}Cr_{11} Pt_{13}(SiO_2)_4$ magnetic film was sputtered onto and in an epitaxial relation with the $Co_{72}Cr_{16}Re_8(SiO_2)_4$ intermediate film. The $Co_{72}Cr_{11} Pt_{13}(SiO_2)_4$ film was ferromagnetic and had a MrT value of about 0.62 memu/cm². The $Co_{72}Cr_{16}Re_8(SiO_2)_4$ intermediate film was non-magnetic because of the combined effect of the Cr and Re content.

As can be seen, even though the $Co_{72}Cr_{11} Pt_{13}(SiO_2)_4$ film had a very low MrT value (0.62 memu/cm²), coercivity was very high. For intermediate layer thicknesses of 70 nm to 10 nm, coercivity gradually increased from about 2020 Oe to about 2150 Oe. For intermediate layer thicknesses below about 10 nm, coercivity dropped to about 1450 Oe. Thus, the presence of the intermediate film helped maintain an excellent, high coercivity (over 2000 Oe).

Figure 6:
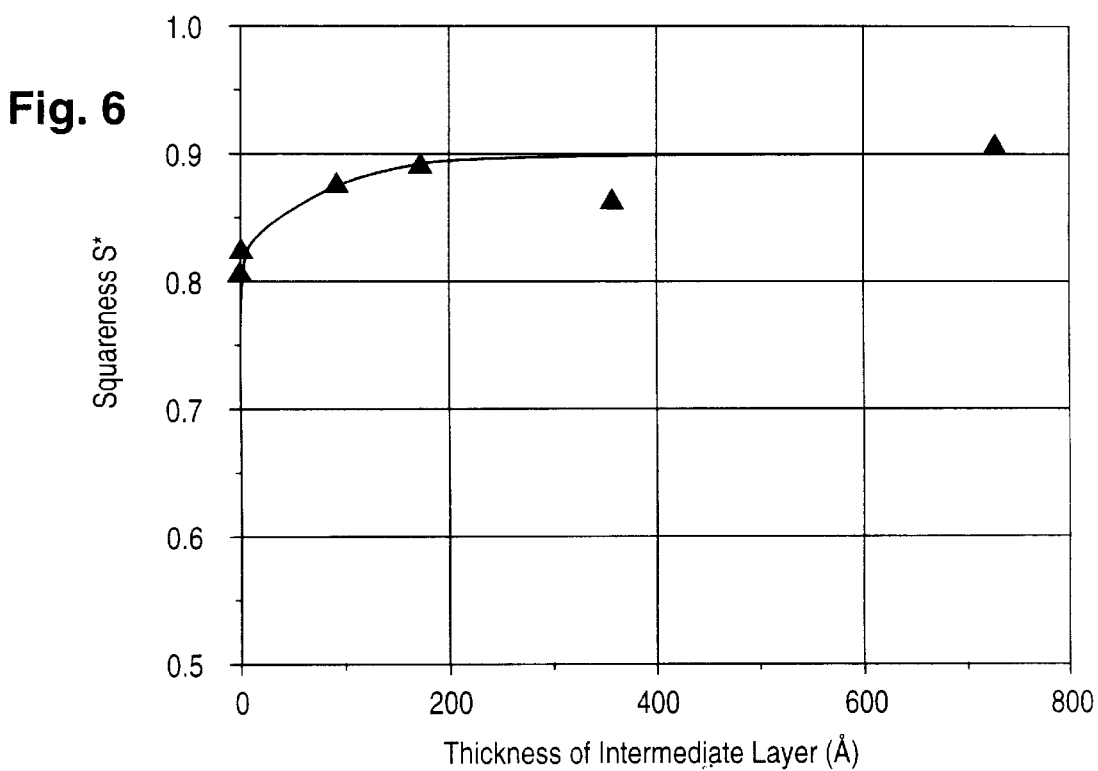
FIG. 6 illustrates the relation between squareness S* of the magnetic layer and the thickness of an intermediate non-magnetic layer in a magnetic disk constructed in accordance with our invention.

FIG. 6 shows the relation between S* and the intermediate film thickness for a magnetic disk having the same structures as in FIG. 5. As can be seen, for intermediate film thicknesses of 20 nm or greater, S* was about 0.9. For intermediate film thicknesses less than 20 nm, S* declined, reaching a value of about 0.8 when there was no intermediate film (i.e. thickness was zero). Thus, again, the intermediate film helped maintain a high S*.

It is believed that the non-magnetic intermediate layer includes a portion that has a poor crystal lattice structure adjacent to the amorphous NiP underlayer. However, the upper portion of the non-magnetic intermediate layer has a good lattice structure. Because the intermediate layer is non-magnetic, it does not detrimentally affect Hc and S* of the magnetic disk. Because the upper portion of the non-magnetic intermediate layer has a good lattice structure, and the magnetic layer forms in an epitaxial relation therewith, the magnetic layer will consist entirely of material having a good crystal structure, even when the magnetic layer is very thin, e.g. 7 nm thick.

As mentioned above, the intermediate film contained about 8% Re. Re serves as a "stabilizer", i.e. Re helps maintain the Co alloy in a HCP (hexagonal closed packed) crystal phase. Other alloying materials that perform this function in a Co alloy include Os, Cr, Re, Rh, and/or Ru, and can be used in a magnetic film in accordance with our invention.

As mentioned above, in lieu of using a Co alloy for layer 18a, other non-ferromagnetic HCP materials or alloys can be used, as long as there is a good lattice match between layer 18b and such materials. The lattice mis-match, if any, is typically less than 10%, and preferably less than 5%. (Thus, the dimensions of crystal unit cells in layer 18a in a plane parallel to the film plane do not differ by more than 10% from the corresponding dimensions for crystal cells in layer 18b.) In this alternate embodiment, as in the previous embodiment, layer 18b is formed directly on and in epitaxial relation to, layer 18a.

Materials which can be used for layer 18a include other HCP materials such as Cr-Ir (40 at. % to 68 at. % Ir), Cr-Rh (40% at. % to 70 at. % Rh), $Cu_5Ge$, Cu-Ge-Ni ($(Cu_{(x)}Ni_{(1-x)})_2Ge$, where x=0–0.3), and Cu-Si (18 at. % to 22 at. % Si). The lattice mismatch for these materials with Co is within about 6%. Other materials having an HCP structure are discussed in Pearson's Handbook of Crystallographic Data for Intermetallic Phases by Villars et al., published by the American Society for Metals in 1985, incorporated herein by reference.

While the invention has been described with respect to specific embodiments, those skilled in the art will recognize that changes can be made in form and detail without departing from the spirit and scope of the invention. For example, instead of sputtering the magnetic layer, other deposition techniques can be used, e.g. vacuum deposition techniques such as evaporation. Also, one can form intermediate layers (either magnetic or non-magnetic) between layers 18a and 18b, as long as the intermediate layer or layers are in an epitaxial relation with layer 18a and layer 18b is in an epitaxial relation with the intermediate layer or layers. Accordingly, all such changes come within the present invention.

We claim:

1. A method for manufacturing a magnetic disk comprising:

depositing a non-ferromagnetic cobalt alloy layer having a HCP crystal structure on a substrate; and depositing a ferromagnetic cobalt alloy layer onto the non-ferromagnetic cobalt alloy.

2. Method of claim 1 wherein said non-ferromagnetic cobalt alloy comprises Co and a sufficient amount of a second material to make said non-ferromagnetic cobalt alloy non-ferromagnetic, said second material comprising a material selected from the list of materials consisting of Cr, Ti, Ta, Re, W, Zr, Hf, Os, Ir, Ru and Rh.

3. Method of claim 1 wherein said non-ferromagnetic cobalt alloy comprises one or more materials selected from the list of materials consisting of Cr, Ti, Ta, Re, W, Zr, Hf, Os, Ir, Ru and Rh, said one or more materials constituting more than about 25 at. % of said non-ferromagnetic cobalt alloy.

4. Method of claim 3 wherein said materials selected from said list constitute more than about 30 at. % of said non-ferromagnetic cobalt alloy.

5. Method of claim 1 wherein said non-ferromagnetic cobalt alloy is deposited on an amorphous underlayer.

6. Method of claim 5 wherein said underlayer also comprises an oxide.

7. Method of claim 1 wherein said non-ferromagnetic cobalt alloy is deposited on a crystalline underlayer.

8. Method of claim 1 wherein said ferromagnetic cobalt alloy layer is formed directly on and in an epitaxial relation with said non-ferromagnetic cobalt alloy layer.

9. Method of claim 1 wherein said ferromagnetic cobalt alloy layer comprises more than about 75 at. % cobalt.

10. Method of claim 1 wherein the Cr, Ti, Ta, Re, W, Zr, Hf, Os, Ir, Ru and Rh in said ferromagnetic cobalt alloy layer, if any, constitute less than 25 at. % of said ferromagnetic cobalt alloy layer.

11. Method of claim 1 wherein the Cr, Ti, Ta, Re, W, Zr, Hf, Os, Ir, Ru and Rh in said ferromagnetic cobalt alloy layer, if any, constitute less than 20 at. % of said ferromagnetic cobalt alloy layer.

12. Method of claim 1 wherein the Cr, Ti, Ta, Re, W, Zr, Hf, Os, Ir, Ru and Rh in said ferromagnetic cobalt alloy layer, if any, constitute less than 15 at. % of said ferromagnetic cobalt alloy layer.

13. A method for manufacturing a magnetic disk comprising:

depositing a non-ferromagnetic HCP alloy layer on a substrate; and depositing a ferromagnetic cobalt alloy layer onto the HCP alloy layer.

14. Method of claim 13 wherein said ferromagnetic cobalt alloy layer is formed directly on and in an epitaxial relation with said HCP alloy layer.

15. Structure comprising:

a substrate;

a non-ferromagnetic cobalt alloy layer having a HCP crystal structure formed on said substrate; and a ferromagnetic cobalt alloy layer formed on said non-ferromagnetic cobalt alloy layer.

16. Structure comprising:

a substrate;

a non-ferromagnetic HCP alloy layer formed on said substrate; and a ferromagnetic cobalt alloy layer formed on said non-ferromagnetic HCP alloy which can be used for longitudinal data recording.

* * * * *